June 11, 1935.  M. HESS  2,004,756
SPOON
Filed Aug. 27, 1934
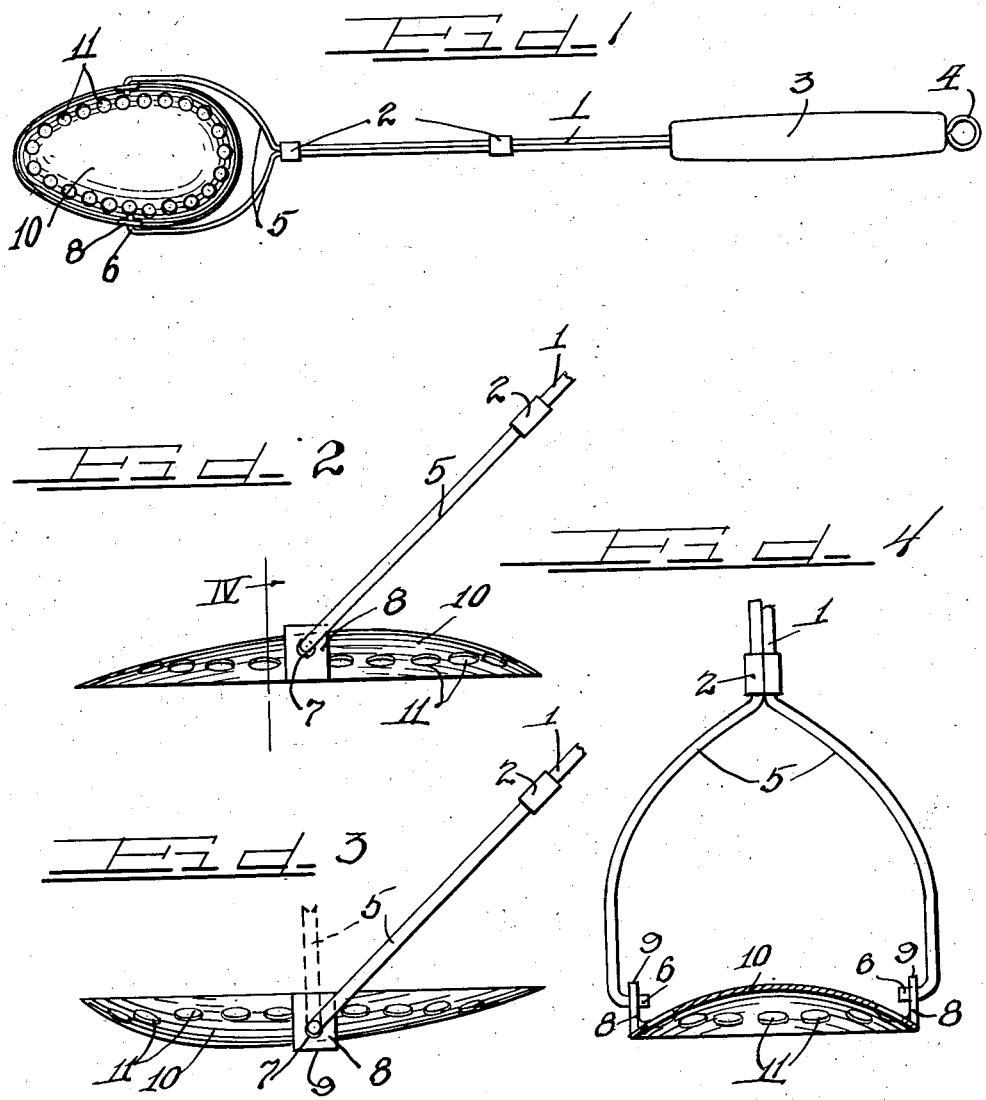
Inventor
Margaret Hess Patented June 11, 1935

2,004,756

UNITED STATES PATENT OFFICE 2,004,756

SPOON

Margaret Hess, Morocco, Ind.

Application August 27, 1934, Serial No. 741,719

2 Claims. (Cl. 259—144)

The present invention relates to a general household utility spoon adapted for mixing, draining and stirring purposes and so constructed as to permit better and improved results to be more conveniently obtained through the use of the completely rotatable bowl mounted between forked arms of the handle member.

It is an object of this invention to provide a spoon with an apertured bowl which is mounted to permit the same to make a complete revolution.

It is also an object of this invention to provide a stirring spoon having an apertured bowl provided with oppositely positioned apertured lugs permitting the apertured bowl to be completely rotated in opposite direction through the plane of the forked arms forming part of the handle mechanism.

Another object of the invention is to provide a stirring spoon having a perforated bowl which is adapted to be rotated into a position substantially at right angles to the handle, with the concave surface of the bowl facing upwardly and with the supporting lugs of the bowl serving as supports permitting the bowl to rest on a flat surface with the handle projecting upwardly.

It is an important object of this invention to provide an improved and simplified form of stirring spoon wherein a wire handle is provided with a wooden grip at one end while the opposite end of the wire handle is forked to support an apertured bowl which is rotatable through a complete revolution between the forked arms of the handle, allowing the bowl to be supported in either an upright or an inverted position with the handle projecting upwardly at right angles therefrom in both the inverted and upright positions of the bowl.

Other and further important objects of this invention will be apparent from the disclosures in the specification and the accompanying drawing.

The invention (in a preferred form) is illustrated in the drawing and hereinafter more fully described.

On the drawing:

Figure 1 is a rear plan view of the spoon embodying the principles of this invention.

Figure 2 illustrates the apertured spoon bowl in an inverted position, with the handle inclined with respect thereto.

Figure 3 is a side view of the apertured spoon bowl in upright position, showing a fragmentary portion of the handle in inclined position and also illustrating in dotted lines an upright position of the handle with the supporting lugs of the bowl serving as supporting feet for the spoon.

Figure 4 is a sectional view taken on the line IV—IV of Figure 2.

As shown on the drawing:

The reference numeral 1 indicates a metal handle constructed of two strands of wire secured together at spaced intervals by stationary gripping sleeves or rings 2. Secured on one end of the handle 1 is a wooden or insulation grip 3 having a looped hanger 4 projecting from the upper end thereof. The two wires forming the opposite ends of the handle 1 are separated or bent outwardly with respect to one another to form forked arms 5, which are bent inwardly at right angles to form supporting studs or bearing pins 6.

The bearing studs or pins 6 project through openings 7 provided in a pair of supporting legs or lugs 8, the outer ends of which are straight, as indicated by the reference numeral 9 to form resting surfaces or edges upon which the spoon may stand when in the position illustrated in Figure 3, with the handle in vertical position. The opposite ends of the supporting legs or lugs 8 are integrally formed on opposite sides of a concavo-convex bowl 10, oval or ovate in plan, and having an oval row of apertures or openings 11 in the margin thereof. With the legs or lugs 8 projecting downwardly when the bowl is in horizontal position, as illustrated in Figure 3, and when the handle 1 projects upwardly at substantially right angles to the bowl, as indicated by the dotted line position of the handle, the bowl 10 may be used as a basket for the purpose of carefully depositing an article or object in a container or the like or for removing an article from the container. The novel construction of the spoon permitting the concave bowl to be positioned face upwardly at substantially right angles to the handle permits an article removed from the container to remain in the concave bowl when the same is in a standing position.

The improved spoon may have the bowl 10 thereof inverted as illustrated in Figures 2 and 4 so that the apertured bowl may be used as a stirring device when projected into a kettle or the like. When the spoon is used as a stirring device as just described, the liquid or material within the kettle is permitted to be strained through the openings 11 of the spoon bowl. In addition to the use of the spoon as a mixing spoon, it may also serve as an agitating spoon or a draining spoon, as desired. By pivotally or rotatably mounting the apertured bowl 10 between the forked arms 5, the forked end of the handle may be swung upwardly around both ends of the spoon bowl, thereby permitting a greater variety of uses for the improved spoon.

It will, of course, be understood that many details of construction may be varied through a wide range without departing from the principles of this invention, and it is therefore not the purpose to limit the patent granted hereon otherwise than necessitated by the scope of the appended claims.

I claim as my invention:

1. A spoon for mixing, draining and stirring and adapted to be revolved through a circle with respect to its transverse axis, said spoon comprising an elongated and apertured spoon-shaped body having a concave face and a convex back and having a pair of oppositely disposed lugs extending downwardly from its rim and intermediate the ends of the spoon, and a handle including a pair of spaced-apart and bent forks having their ends pivotally connected to said lugs, said forks being spaced so that said spoon is adapted to revolve through a circle therebetween.

2. A spoon for mixing, draining and stirring, said spoon comprising an elongated and apertured spoon-shaped body having a concave face and a convex back, oppositely disposed means on the back of the body and positioned contiguous to the rim of the spoon and intermediate the ends thereof to receive the ends of a bail, and a bail having its ends pivotally connected to said oppositely disposed means.

MARGARET HESS.